United States Patent
Burke

(10) Patent No.: US 6,977,667 B1
(45) Date of Patent: Dec. 20, 2005

(54) METHOD AND APPARATUS FOR GENERATING A PROGRAMME

(75) Inventor: Trevor John Burke, Wirral (GB)

(73) Assignee: Trevor Burke Technology Limited (GB)

( * ) Notice: Subject to any disclaimer, the term of this patent is extended or adjusted under 35 U.S.C. 154(b) by 0 days.

(21) Appl. No.: 09/462,550

(22) PCT Filed: Jul. 10, 1998

(86) PCT No.: PCT/GB98/01817

§ 371 (c)(1),
(2), (4) Date: Mar. 14, 2000

(87) PCT Pub. No.: WO99/03275

PCT Pub. Date: Jan. 21, 1999

(51) Int. Cl.$^7$ .............................. H04N 7/16; G09G 5/00
(52) U.S. Cl. ....................... 345/723; 348/564; 725/134; 725/142
(58) Field of Search .................................. 348/553, 725, 348/714, 564; 345/720–723, 726; 725/98, 97, 95, 142, 134, 38, 39; 386/52, 83

(56) References Cited

U.S. PATENT DOCUMENTS

| 5,426,652 | A | * | 6/1995 | Heiman | 371/30 |
| 5,517,320 | A | * | 5/1996 | Schuler | 358/375 |
| 5,537,528 | A | | 7/1996 | Takahashi et al. | |
| 5,659,366 | A | * | 8/1997 | Kerman | 348/460 |
| 5,818,439 | A | * | 10/1998 | Nagasaka et al. | 345/327 |
| 5,821,945 | A | * | 10/1998 | Yeo et al. | 345/440 |
| 5,852,435 | A | * | 12/1998 | Vigneaux et al. | 345/302 |
| 5,940,073 | A | * | 8/1999 | Klosterman et al. | 345/327 |
| 6,154,600 | A | * | 11/2000 | Newman et al. | 386/4 |
| 6,353,699 | B1 | * | 3/2002 | Schwab | 386/46 |

FOREIGN PATENT DOCUMENTS

EP 0705036 4/1996

WO WO 96/27958 9/1996

OTHER PUBLICATIONS

Marc Davis, *Media Streams: An Iconic Visual Language for Video Annotation*,IEEE Symp. Visual Lang. 1993 v.9, pp. 196–202.

Marc Davis, Media Streams: An Iconic Visual Language for Video Annotation, Telektronik 1993 v. 89 (4), pp. 59–71.

Marc Davis, *Media Streams: An Iconic Visual Language for Video Representation,*Human Readings in Computer Interaction Towards 2000, pp. 854–866.

Marc Davis, *Garage Cinema and The Future of Media Technology,*Communications of the ACM 1997 v. 40 (2), pp. 42–80.

Marc Davis, *Knownledge Representation for Video, 12$^{th}$* Proc.'s Nat. Conf. Artif. Intelligence 1994 v. 1.

* cited by examiner

*Primary Examiner*—Victor R. Kostak
(74) *Attorney, Agent, or Firm*—Foley & Lardner LLP

(57) ABSTRACT

A method and apparatus for generating a programme for presentation as a sequence of programme elements from a set of pre-recorded programme elements which may be transmitted to a receiver. Programme elements each representing for example an event are classified on the basis of programme element content, that is the nature of the event to which the programme element relates. Each programme element is allocated to at least one of the predetermined set of classes and each programme element is stored with at least one associated programme classification code. The classification codes identify the class to which the associated programme element has been allocated. A programme element is generated by selecting at least one programme classification code and presenting programme elements associated with that selected at least one programme classification code. Users are able to generate programmes based on for example the perceived value of individual programme elements.

22 Claims, 5 Drawing Sheets

| 15 | 14 | 13 | 12 | 11 | 10 | 9 | 8 | 7 | 6 | 5 | 4 | 3 | 2 | 1 |
|----|----|----|----|----|----|---|---|---|---|---|---|---|---|---|
| J  | D  | J  | J  | B  | A  | B | D | J | H | H | H | G | E | J |

FIG. 3

| 1  | 1  | 0  | 0  | 0 | 0 | (J - - - -) |
|----|----|----|----|---|---|-------------|
| 2  | 1  | 2  | 0  | 0 | 0 | (J E - - -) |
| 3  | 1  | 2  | 3  | 0 | 0 | (J E G - -) |
| 4  | 1  | 2  | 3  | 4 | 0 | (J E G H -) |
| 5  | 1  | 2  | 3  | 4 | 5 | (J E G H H) |
| 6  | 6  | 2  | 3  | 4 | 5 | (H E G H H) |
| 7  | 6  | 2  | 3  | 4 | 5 | (H E G H H) |
| 8  | 6  | 2  | 3  | 8 | 5 | (H E G D H) |
| 9  | 6  | 2  | 3  | 8 | 9 | (H E G D B) |
| 10 | 10 | 2  | 3  | 8 | 9 | (A E G D B) |
| 11 | 10 | 2  | 11 | 8 | 9 | (A E B D B) |
| 12 | 10 | 2  | 11 | 8 | 9 | (A E B D B) |
| 13 | 10 | 2  | 11 | 8 | 9 | (A E B D B) |
| 14 | 10 | 14 | 11 | 8 | 9 | (A D B D B) |
| 15 | 10 | 14 | 11 | 8 | 9 | (A D B D B) |

FIG. 4

METHOD AND APPARATUS FOR GENERATING A PROGRAMME

BACKGROUND

1. Field of the Invention

The present invention relates to the generation of programmes made up from a series of programme elements each of which is represented by a data packet. Individual programme elements may define for example single images or series of images or audio passages. The programme elements may be distributed in pre-recorded form, or transmitted to a recipient provided with equipment for recording programme elements for subsequent replay.

2. Related Art

Before the advent of recording equipment and in particular video recorders, programmes were produced and distributed via the atmosphere or cable and simply reproduced by recipient's receivers. There was no possibility whatsoever for a recipient to control the received programme over and above turning the receiver on or off.

Video recorders made it possible for a recorded programme to be viewed selectively in that a recording tape could be advanced to a part of the programme of interest which could then be viewed, it not being necessary to view every element of the programme recorded on the tape. Video disc players were then introduced in which individual programme elements were separately indexed such that each programme element could be rapidly accessed as compared with a video tape storage system. There was no fundamental difference however between tape and disc systems in terms of the degree to which a user could interact with the recorded programme in that the user had to know where on the recording medium programme elements of interest were located and thus required knowledge of which programme element was recorded where on the recording medium. Programme elements were recorded on the basis that each programme element was allocated to a particular position on the recording medium, access to any one programme element in essence requiring an index in which programme element identity is related to storage medium position.

Interactive video programme are now available in which programme elements are stored in the memory of a computer and programmes are produced which in part are dependent upon actions taken by an operator of the computer. (The term "memory" is used herein to include solid state, disc, CD and any other form of data storage capable of storing programme elements). For example a computer game may display images to a user which are read out from the computer memory, the user may then take actions appropriate to the displayed image, and depending upon the actions taken by the user the programme content will change. For example the user may "kill" an adversary depicted on the computer monitor's screen, the actions taken by the user to kill the adversary determining the nature of the sequence of images and associated audio output generated by the computer. Thus there is a limited degree of interaction between the user and the programme in that the order of presentation of stored programme elements is dependent upon actions taken by the user, but essentially the user does no more than determine which route is taken through a complex set of alternative routes defined by the computer so as to produce a series of images corresponding to that route. The user has no way of knowing what the next programme element to be displayed will be, unless the user has played the game a sufficient number of times to learn the response of the computer to a particular control input.

Viewers cannot "edit" programmes with current systems. There are often circumstances in which a viewer of a programme knows the kind of elements of a programme which will be of interest and which will not, and yet a viewer cannot make selections of programme elements of interest even from a recorded programme without a detailed index that describes the nature of each programme element which is recorded at a particular position in a recording medium.

There are circumstances in which it would be highly desirable for a user to be able to edit programme content. In many circumstances, particularly in the case of broadcast sports programmes, potential viewers of those programmes are really interested in only relatively small sections of a broadcast sporting event. For example, with live broadcasts, sections of high interest value, for example the scoring of a goal, are often repeated at the expense of not broadcasting passages of play which are relatively uninteresting, for example the period leading up to the game being restarted after the scoring of a goal. The perceived value of a broadcast programme is considerably enhanced by such "action replays" but it is frustrating for a viewer not to be able to decide which sections of a game to replay and to be forced simply to accept what is broadcast by the programme producer.

It is often the case that elements of real interest in a sporting event could be delivered over a relatively slow communications channel the bandwidth of which is insufficient to carry a full live broadcast of the event. Thus, bandwidth restraints are a real limitation of broadcast television systems. Furthermore, the resolution available with standard personal computer display screens is far greater than that available with a standard television receiver, and this can be a severe limitation in some circumstance where images of great detail are required to enhance viewer appreciation. The available resolution cannot be used however with broadcast programmes given the limited resolution of the broadcast images. At present, the only way that enhanced quality images can be made available is by the distribution of programme material on disc, and clearly such an approach would not generally be appropriate for ephemeral events such as sports fixtures.

It is an object of the present invention to provide improved methods and apparatus for generating a programme in order to address one or more of the problems outlined above.

According to the present invention there is provided a method for generating a programme for presentation as a sequence of programme elements from a set of pre-recorded programme elements, wherein the programme elements are classified on the basis of programme element content such that each programme element is allocated to at least one of a predetermined set of classes, each programme element is stored with at least one associated programme classification code, each classification code identifying a class to which the associated programme element has been allocated, and a programme is generated by selecting at least one programme classification code and presenting programme elements associated with the said at least one programme classification code.

Programme elements may be classified by reference to a type of event to which the element relates, for example a shot on goal or the scoring of a goal in a football match. Alternatively, programme elements may be classified by reference to a subjective assessment of the value of the programme element, for example the level of excitement generated by a particular passage of play in a football match.

Thus the classification codes can be used to give information to a user of the system which is not merely defined in terms of the position of a particular event in time but rather to the nature of the event itself.

Programme element selection which is required to generate the programme presented to a user may be controlled automatically by applying predetermined selection criteria, for example by repeating stored programme elements sequentially so as to only present programme elements with a predetermined classification value. Alternatively, programme element selection may be controlled by an operator of a display device connected to the system. For example symbols may be displayed representing the class of each stored programme element, and the operator may select programme elements by selection of associated symbols. Symbols may be displayed in an order corresponding to a temporal order of events presented by the associated programme element.

The operator may select a sub-set of the classes, and symbols corresponding only to programme elements of that sub-set may be displayed. Programmes may be generated comprising a plurality of programme elements which are presented simultaneously, for example in the form of combined video and audio programme elements or combined video and still image programme elements.

The programme elements may be delivered to an end user on a data carrier such as a tape or CD but generally will be transmitted to and stored at a user's receiver with the associated programme classification codes. Programmes are then generated by selection of classification codes at the receiver.

Only programme elements associated with a sub-set of the classes may be transmitted to the receiver, the sub-set being selected by a user of the receiver. Alternatively, only received programme elements corresponding to a sub-set of the classes are stored at the receiver, the sub-set being selected by a user of the receiver. Thus a user can filter out programme elements with a perceived value of less than a certain threshold either by transmitting a control signal which prevents programme elements that are not of interest being transmitted to the receiver at all or by discarding received programme elements with a perceived value of less than the threshold.

Received programme elements may be combined with pre-recorded programme elements store on a data carrier in a memory device of the receiver so as to enhance the perceived value of the generated programme. For example images related to a particular golf course can be combined with images and audio related to live elements at that golf course.

Although the invention is applicable in circumstances in which a communications channel used to transmit programme elements has the capacity to carry a continuous live broadcast of for example a sporting event, the invention is applicable in circumstance in which communications channels do not have such a capacity. When using such channels, it will take longer to send a programme element representing a particular event than the time occupied in the generated programme by that programme element. This is not a problem however as programme elements can be repeated such that a continuous programme can be generated.

The invention also provides a method for generating a programme for presentation at a receiver by transmitting a stream of programme element data packets and associated programme generation control data to the receiver, storing the programme element data packets and associated programme generation control data at the receiver, and generating a programme by reading out the programme element data packets in a manner dependent upon the programme generation control data, the programme element data packets being read out such that the duration of at least one programme element in the generated programme is less than the time taken to transmit the data packet of that programme element from the transmitter.

Thus, although in the preferred embodiment of the invention individual programme elements are associated with classification codes selected on the basis of the content of the individual programme elements, classification codes do not have to be generated and instead it is possible simply to transmit control data which enable programme elements to be repeated so as to produce a continuous generated programme despite the fact that programme elements are transmitted over a communications channel of limited capacity. Programme generation may be controlled automatically in accordance with a predetermined routine or by a user of the receiver to whom the control data is displayed so as to enable programme element selection.

BRIEF DESCRIPTION OF THE DRAWINGS

Embodiments of the present invention will now be described, by way of example, with reference to the accompanying drawings, in which:

FIGS. 3 and 4 schematically represent the generation of programme element data packets and associated classification codes and the storage of received programme element data packets and associated codes at a receiver;

DETAILED DESCRIPTION OF PREFERRED EMBODIMENTS OF THE INVENTION

Figure 1:
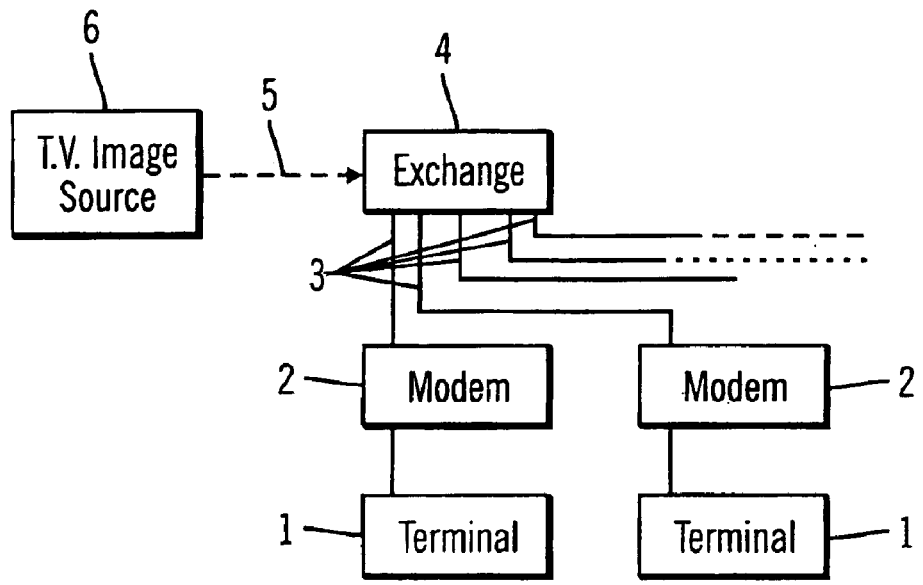
FIG. 1 is a schematic representation of the overall structure of a system in accordance with the present invention.

Referring to FIG. 1, terminals 1 which may be conventional PC's (Personal Computers) are connected via conventional modems 2 and telephone lines 3 to a conventional telephone exchange 4. The telephone exchange receives either via existing telephone links or via a direct connection 5 programme element data packets and programme generation control data from a programme source 6. Conventional data compression techniques may be used such that the transmitted programme element data packets include for example only the data necessary to represent the changes between successive frames of a programme element. Each programme element may include a predetermined number of successive frames, although a programme element could be made up of only a single frame. For example, a single frame could be transmitted as part of a data packet including voice data describing that single frame.

Figure 2:
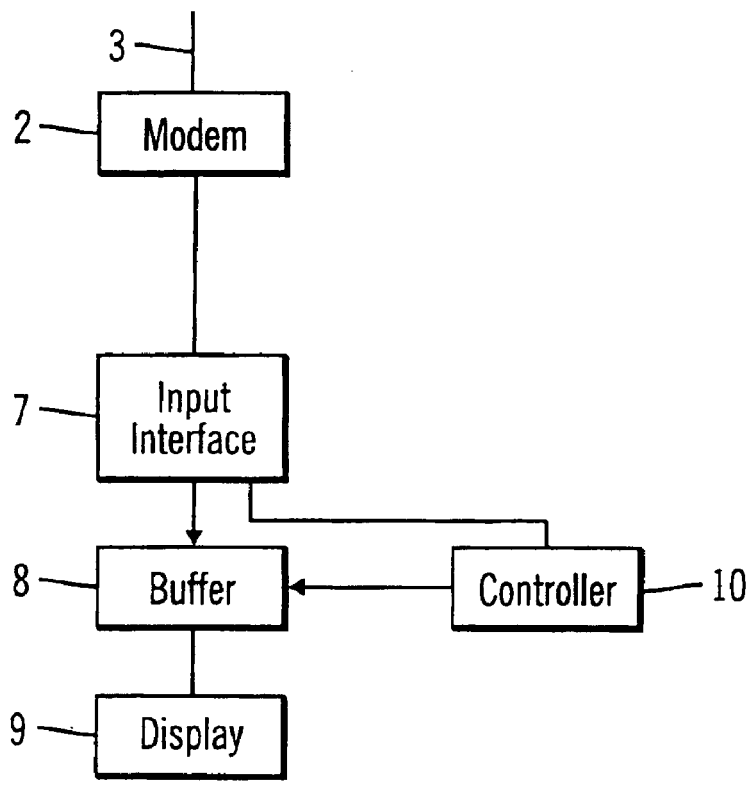
FIG. 2 is a schematic representation of equipment provided at each receiver of the system of FIG. 1.

Referring to FIG. 2, each terminal comprises and input interface 7, a buffer 8 and a conventional display device 9. Programme element data packets are stored in the buffer 8 and read out under the control of a controller 10 which receives the programme generation control data via input interface 7 and modem 2 from the telephone line 3.

Each terminal 1 receives a stream of data which is delivered to the input interface 7 from the modem 2, the stream of data incorporating programme element data packets, from each of which one or a series of video images and associated audio output can be generated, and control signals which are subsequently used to control the display of programme element data packets stored in the buffer. For example, the buffer may be capable of storing data packets representing two minutes of a continuous real-time programme. If that data was to be read out to the display at a rate corresponding to the normal frame rate of a conventional television system, all of the image data stored in the buffer would be read out in two minutes. Assuming a data rate on the telephone line 3 which is only one sixth of that required for continuous real-time reproduction, only two minutes in every twelve minutes of a real-time event could be reproduced as data would be read out of the buffer faster than it could be updated in the buffer. In accordance with the present invention, programme element data is stored in the buffer for subsequent reproduction in dependence upon control signals from the controller 10, the selection of programme element data to stored and reproduced being such as to enhance the perceived quality of the programme appearing on the display 9.

For example, if the programme element data packets received represent a sporting event, image data representing only one sixth of the image data generated at the sporting event would be transmitted to the buffer. The received image data would however be replayed in a manner which effectively conceals the fact that image data representing periods of the sporting event which are of little visual interest has been discarded. Thus for example a ten second sequence leading up to the scoring of a goal would be transmitted once but might be reproduced several times. It will be appreciated that even with conventional real-time live television broadcasts, highlights are often repeated a number of times, thereby discarding some of the images generated at the event. During a relatively dull period of a match, programme element data related to a relatively more interesting part of the event would be transmitted to the terminal. During a relatively dull period of an event, programme element data might not be transmitted to the terminal or, in the absence of any relatively more interesting passages of play, data packets could be transmitted which would be allocated a relatively low priority. A subsequently occurring passage of relatively greater interest could be subsequently transmitted and displayed as soon as it is resident in the buffer. Accordingly by allocating different priorities to different sequences of images a controller of the system can control the images displayed to the end user so as to maximise the perceived value of the programme that the images constitute.

FIGS. 3 and 4 seek to illustrate one possible embodiment of the invention as described with reference to FIGS. 1 and 2. FIG. 3 represents 15 successive programme events each of which is represented by a data packet identified by numbers 1 to 15. The system operator allocates "value" to each of the programme elements in the form of a priority code, those codes being represented by letters A to J, with the letters being allocated in order such that the programme elements of maximum interest are allocated to a class identified by letter A and programme elements of minimum interest are allocated to a class identified by letter J. For the purposes of this example, it will be assumed that each programme element lasts exactly one minute but requires two minutes to be transmitted to the terminal. The terminal buffer is capable of storing five one minute programme elements at a time. FIG. 4 illustrates which programme elements are stored at the terminal during each of the fifteen periods represented by the programme element illustrated in FIG. 3. The left hand column in FIG. 4 represents the number of each of the fifteen programme elements, the second to sixth columns in FIG. 4 represent the contents of five memory locations in the terminal, showing which programme element is stored at the end of each period, and the letters in the seventh to eleventh columns represent the value allocated to the stored programme elements.

It will be seen that in the first period programme element 1 is generated, transmitted to the terminal and stored. Likewise in the second, third, fourth and fifth periods, the second to fifth programme elements are generated, transmitted and stored. At this time in the process ten minutes will have elapsed. During that ten minutes period the user will have been presented with a series of images made up from the information as stored. For example during the fifth period, programme elements 1 and 2 may be presented sequentially during the time that the fifth element is being delivered. The sixth programme element has a higher priority than the first programme element and therefore it is transmitted and stored in the first memory location. The seventh element has a lower priority than any of the stored programme elements and therefore is not transmitted. The eighth element has a higher priority than the oldest of the H value programme element (programme element 4) and therefore is transmitted and replaces that element in the store. The ninth element then replaces the fifth programme element, the tenth element replaces the sixth element, the eleventh element replaces the third element, the twelfth element is not transmitted as it has a lower value than any of the stored values, the thirteenth element is not transmitted as it has a lower value than any of the stored values, the fourteenth element is transmitted as it has a higher value than programme element 2, but the fifteenth element is not transmitted as it has a lower value than any of the stored values.

Clearly if the simple routine according to FIG. 4 was followed without fail, in the end all of the memory locations would be filled with high value programme elements which might, depending on the application, become "stale", in which case one could have a routine for example to reduce the priority of stored programme elements over time so that the stored programme elements are "refreshed". For example the priority level of any stored programme element could be reduced by one step every two cycles of the routine.

FIG. 3 and explain how programs data packets are delivered to a terminal but do not explain the manner in which those packets are used to generate a programme. Many alternative control schemes could be envisaged. For example, the terminal could automatically generate a programme from the stored elements, cycling through the stored elements in a predetermined manner. For example all A priority programme elements could be repeated say three times, all B priority programme elements could be repeated once, and so on. Programme elements could be of varied duration so as to enable the allocated priorities to represent programme elements which begin and end with natural break intervals, for example to coincide with interruptions in play. As an alternative to automatic programme generation control however, it would be possible for the operator of the terminal to have total control of the images presented, for example by presenting the operator with an image representing the priority value allocated to the locally stored programme elements for direct selection of programme elements of interest by the terminal operator.

Figure 5:
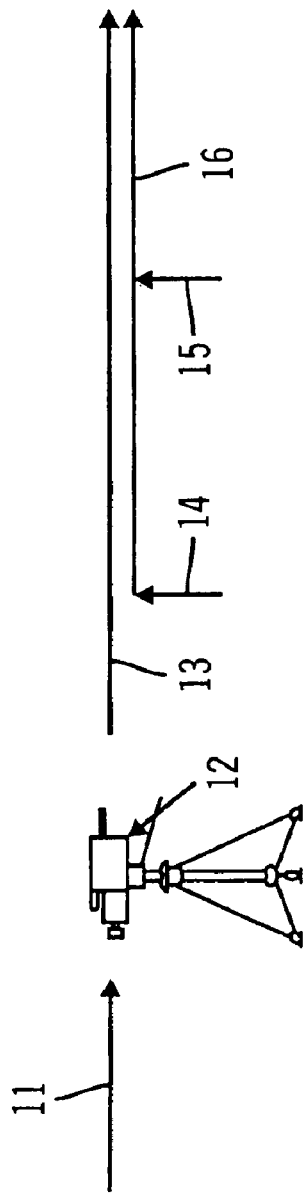
FIG. 5 is a schematic representation of the addition of classification codes to television signals produced at a programme source.
Figure 6:
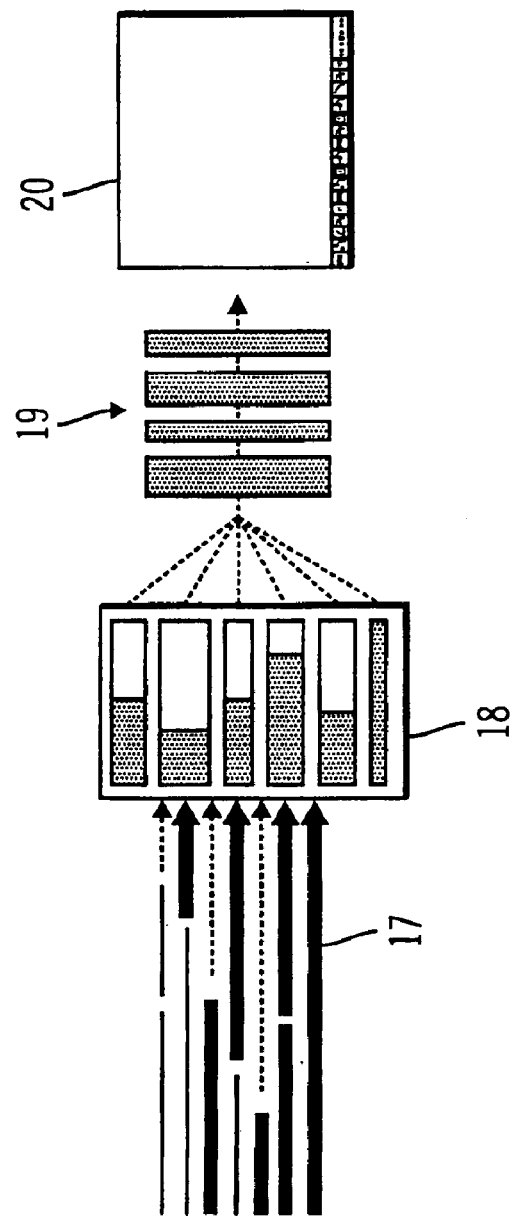
FIG. 6 is a schematic representation of the storage and use of programme element data packets and associated classification codes at a receiver.

FIG. 5 is a graphical representation of a process which can be used to generate a data stream the content of which enables the operator of a terminal receiving that data system to "edit" a set of received programme elements to produce a programme uniquely adapted to the user's wishes. FIG. 6 represents the handling of the data stream at the user terminal, FIG. 7 the appearance of a screen represented to a smaller scale in FIG. 6, and FIG. 8 a series of symbols or "icons" displayed on the screen of FIG. 7 with a series of sequence numbers to assist in understanding the description of the significance of those icons set out below.

Referring to FIG. 5, data represented by arrow 11 is captured by a TV camera 12 to produce a stream of digital data represented by arrow 13, that digital data defining the video and audio content of the events taking place in front of the camera 12. As the data is generated, a system operator allocates classification data to the video and audio content of the data stream 13, the classifications being a subjective indication of the content of the associated programme element data packages. The value classification data is represented in FIG. 5 by the arrow 14. Further control data may be added as represented by arrow 15 to further classify the subjective value data 14, for example the identity of a team responsible for a particular event. The combined data 14 and 15 is output as represented by arrow 16 in the form of control data.

The two data streams represented by arrows 13 and 16 are delivered to a transmitter, transmitted to a terminal and stored in a terminal buffer as represented in FIG. 6. The combined data stream is represented by lines 17 and the buffer by rectangle 18. In the buffer, each class of data is stored according to its class type in its own area of the buffer, the class type corresponding to the subjective value allocated to the associated programme elements. Data is read out from that buffer as represented by lines 19 in accordance with commands delivered to the buffer 18 by the user on the basis of information displayed on the terminal display screen 20.

Figures 7, 8:
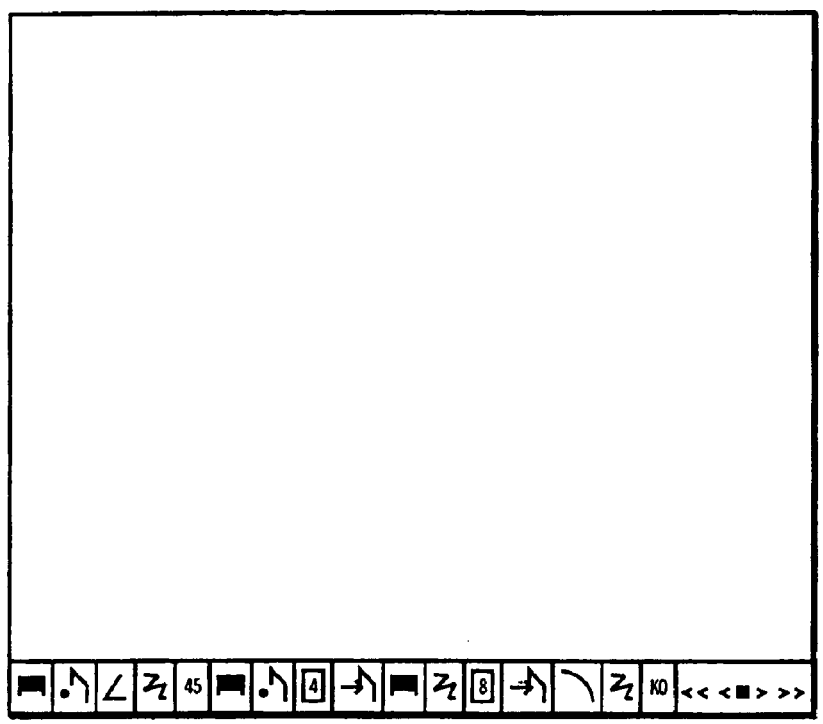
FIG. 7 is a view of a display screen showing FIG. 6 to a larger scale.
FIG. 8 is a schematic representation of symbols displayed on the screen of FIG. 7 to represent the progress of a sporting event.

Referring to FIG. 7, this is a larger reproduction of the screen 200 of FIG. 6. The blank area which occupies most of FIG. 7 corresponds to area of the display screen on which programme elements will be displayed, and the symbols appearing at the bottom of the screen correspond to displayed icons which represent the content of a series of programme element data packets stored in the buffer 18.

Referring to FIG. 8, the icons appearing at the foot of the screen shown in FIG. 7 are reproduced next to numbers 1 to 16. Assuming that programme element data packets are being delivered at a rate such that real-time reproduction of a live event can be produced, the display screen will show the liver action. Programme elements of particular interest are however stored for later reproduction, each stored programme element being classified and represented by an associated icon. The first icon corresponds to "kick off", that is the first passage of the game. The second icon indicates a high quality passing sequence, the third a high quality long pass, the fourth a shot on goal, the fifth a yellow card warning to player number 8, the sixth a further high quality passing sequence, the seventh a goal, the eighth a further shot on goal, the ninth a further yellow card warning to player number 4, the tenth a penalty, the eleventh another goal, the twelfth half time (45 minutes), the thirteenth another high quality passing sequence, the fourteenth a corner, the fifteenth a penalty, and the sixteenth another goal. Home team icons may be highlighted for example in read and away team icons in black.

The icons appear from the bottom left of the screen and continue moving to the right as the game processes. This means that the oldest recorded events are on the right. Further events will cause the oldest events to be displaced.

The programme element data packets represented in FIG. 8 are generated by storing only data packets including events which are of interest to the terminal operator as defined by a minimum priority set by that operator. For example none of the recorded programme elements corresponds to boring periods of play. The user can simply review the icons and switch between different icons using a keyboard or remote control device in a conventional manner, for example by moving a cursor on the simulated control panel at the bottom right hand corner of FIG. 7. It is easy for the operator to see in the example represented in FIG. 8 that there were ten highlights exceeding the operators threshold setting before half time. The colour of the icons will indicate which team if any dominated play. It can be seen that there was a good passing movement, a good long forward pass before an identified player received a yellow card. The first half included two goals for teams identified by the colour of the associated icon. The current score can be determined by looking at the colour of the three icons representing the scoring of a goal. The terminal operator has the choice of either seeing the whole broadcast programme, seeing all the highlights, or jumping through the sequence of highlights in any desired order.

Thus a terminal operator can either watch a programme in a conventional manner, or skip through parts of broadcast programme looking at only those sections of real interest, or periodically review the displayed icons to see if anything of sufficient interest has happened to merit further attention. The operator can thus use the system to identify programme elements of interest without it being necessary for the operator to do more than glance occasionally at the screen. The operator can make a decision to record all or only highlights of a broadcast programme, interact with the programme by actively selecting programme elements to be displayed, or allow the system to make a selection of programme elements to be stored in accordance with a predetermined value selection keyed into the terminal at an earlier time by the user, or allow the generation of a continuous programme by allowing the classification data transmitted with the programme elements to control programme generation in accordance with a default set of value selections determined by the system provider. The system can be used in circumstances where the data delivery communications channel can carry data at a rate sufficient to accommodate all of the real-time programme transmission, or at a rate higher than a conventional transmission (to allow the generation of for example high definition images), or at a rate lower than a normal transmission (in which case a "full" programme can be achieved by repeating previously stored programme elements as necessary).

In terms of the significance to the user of the capabilities of the system, the terminal gives great flexibility so that the terminal operator can choose to experience a broadcast event in any of a large number of ways, for example by:
1. Setting a threshold value to select only highlights of a transmission.
2. Setting a threshold value which could be transmitted to the programme source and used at that programme source to select "above threshold" passages of play from for example more than one sporting event.
3. Displaying by means of icons a "storyboard" of a sequence of events to allow rapid access to events of particular significance.

4. Choosing to permanently record any set or subset of highlights.
5. Recalling and replaying any stored item at will substantially instantaneously.
6. Storing programme elements and associated icons for review at the icon level or as a full programme at a later time.
7. Storing automatically only the highlights of an event for later review, thereby reducing storage requirements.
8. Arranging for the system to take out elements of a broadcast event of little interest to the viewer.
9. Watching a programme live and automatically storing highlights for later replay.
10. Using the system to "watch" a programme so as to alert the operator when something interesting is happening.

In reduced bandwidth systems in which the available bandwidth does not allow the delivery to the user's terminal of all of the real-time broadcast signal, it is necessary to "expand" the time occupied on the screen by transmitted programme elements so as to "fill in" periods of time during which programme elements are being transmitted. This can be achieved by simply repeating programme elements, assuming that each viewed programme element corresponds to the simple reproduction of a real-time series of events, or by using still images and associated audio signals. There are many occasions, particularly during lapses in action, where a still picture and well recorded sound is better than poor video in terms of enhancing the entertainment value. Such an application of the present invention is described with reference to FIG. 9.

Figure 9:
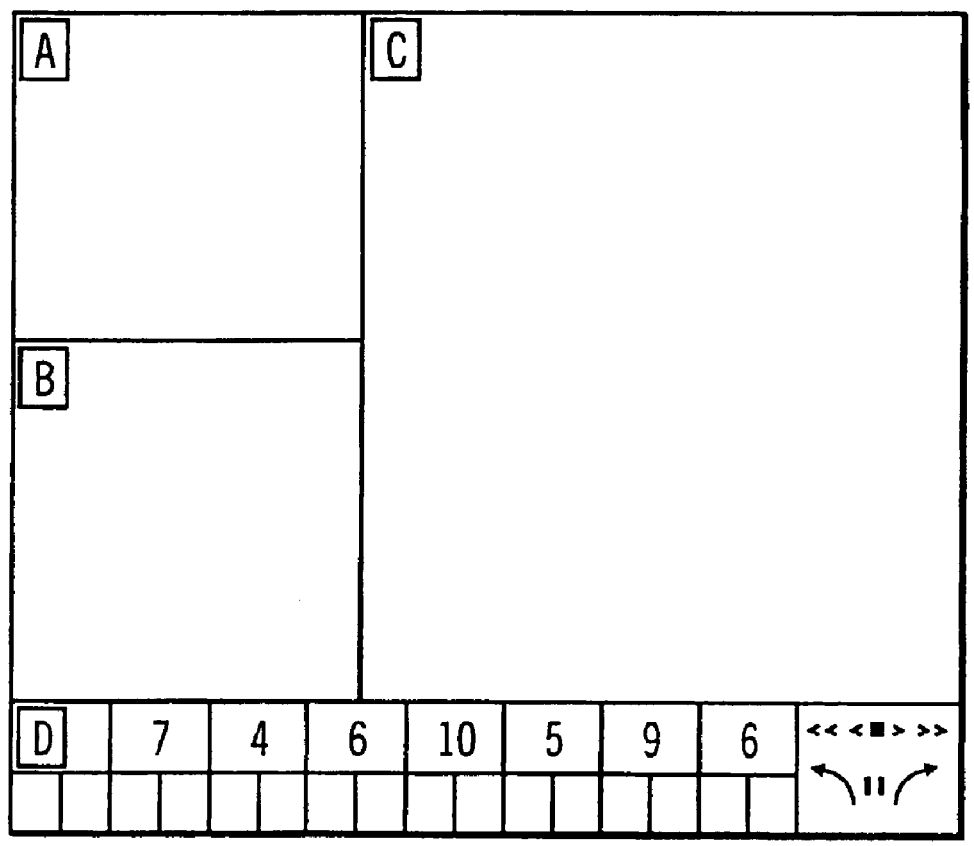
FIG. 9 is a schematic representation of a display screen in a form suitable for the generation of a programme including simultaneously reproduced programme elements.

FIG. 9 represents a screen which has been split into four sections A to D. These different sections can be used for any specific purpose, can vary in size, and their usage may be changed according to the dynamics of the broadcast material. For the purposes of illustration section A of FIG. 9 may be used to display a moving video picture, section B diagrams or graphs, and section C a high quality still picture. An associated audio programme is also produced. For example, the system illustrated schematically in FIG. 9 can be used in association with the broadcast of a programme describing a golf tournament. A golfer may be shown standing on the fairway of a particular hole at a famous gold course in section A of the screen. The golfer can be describing the beauty of the course and how he would play that hole. Section C of the screen can be used to present a very high quality image of the golfer's current location. Section B may contain a plan of the hole showing where the golfer's first drive finished, with distance markers, ranges and the like.

The golfer can work to a script which directs the user's attention to selected parts of the screen. For example the golfer may draw the attention of the terminal user to the way the ground falls away to the left, the dangers of over-itching straight into a bunker guarding the green, and the beauty of the course and various geographical features. All the time that the golfer is delivering this message, there is no motion at all on the screen. If the golfer talks for 20 seconds about the still picture image on the screen, this gives 20 seconds for the next video section to build up in the system buffer. That next video section can then be replaced at a higher speed than that at which it was recorded in the buffer so as to improve the perceived quality.

Further pre-recorded data packets may be used to make up the final programme. For example an illustration of the golfer's technique of relevance to the particular hole may be taken from a library of information held on a CD in the PC CD drive, that information being displayed in section A of the screen whilst a sponsors message appears in place of the course plan in section B.

Section D of the screen shows icons, in the illustrated case numbers, which are either subjective ratings by the programme producer of the significance of associated programme elements, or identify particular events in a manner similar to the football example illustrated in FIGS. 5 to 8. This makes it possible to the user to jump between sections of the programme, repeating sections of interest at will, thereby once again obtain control over the programme as a whole.

It will be appreciated that programme elements can be reproduced serially, that is a programme could be made up of programme elements presented on at a time with no overlap between successive elements, or in parallel, that is a programme may be made up of programme elements some of which will be presented simultaneously. The simultaneous presentation of programme elements could enhance a user's appreciation in various circumstances. For example, if a programme to be presented to a user is intended to represent the progress of a car race, most of a display screen could be occupied by an image showing the two leading cars in the race, with the remaining area of the screen showing an image representing the approach to the finish line of that race. Such combinations of images can enhance the appreciation of a programme by linking together two events where a first one of the events (the relative position of the two leading cars) and a second event (their approach to the finishing line) is of significance to an overall appreciation of the subject of the programme.

It will also be appreciated that combinations of images can be presented either serially or in parallel so as to enhance the impact of advertisements by linking the presentation of particular advertisements to the occurrence of particular events. For example, programme elements representing the progress of a motor race may be combined with a programme element representing advertising images the presentation of which can be linked to the progress of the race. One possibility would be to put on the screen advertising material relevant to the sponsor of a race car or the supplier of tyres to a race car at the time that race car successfully crosses the finishing line. A sponsor's message could thus be superimposed on or otherwise combined with images of the winning race car and driver.

The embodiments of the invention described above assume that programme element classification is controlled by the source of the programme elements. It is possible however for a user of the system to determine the programme element classifications, either to replace classifications set by the programme element source, or to establish a set of programme elements and associated classifications from an unclassified broadcast programme. For example, a user could receive a broadcast of an event, store the entire broadcast, divide the stored programme into programme elements of interest, and set classifications for each programme element of interest. Thus a user could classify programme elements related to a sporting event on a basis ideally suited to the interests of that user, thereby enabling a subsequent reproduction of the programme elements in a manner controlled by reference to the user's own classification system. A user would not then be forced to rely upon the classification system considered appropriate by the programme element source but could se up classifications matching the particular user's interests however idiosyncratic those interests might be.

Programme element classification can be used in a variety of ways, for example to "time stamp" the beginning of one programme element in a programme made up from a series of sequentially presented programme elements. Thus a user wishing to suspend a programme for a period of time so as to enable for example a telephone call to be answered could in effect apply a "time stamp" classification to the programme element being watched at the time the decision to suspend is made, the applied classification being a flag identifying the point in the programme to which the viewer will wish to return after viewing restarts. The time stamp classification would in effect modify the manner in which stored programme elements are presented by causing the system to bypass all earlier programme elements in the series of programme elements making up the programme to be viewed.

In embodiments of the invention described with reference to FIGS. 3 and 4, programme elements are classified by reference to a "value" assessment of individual elements. In the embodiment of the invention described with reference to FIGS. 7 and 8, classification is by reference to the nature of the event. It will be appreciated that various graphical representations of the classifications associated with individual programme elements could be presented to users. For example, in a classification system based on programme element "values" on a scale of 1 to 10, the values of a series of programme elements representing successive events in a real-time broadcast programme may be presented in the form of a bar chart, each bar of the chart having a length corresponding to the value in the range 1 to 10 allocated to a respective programme element. Such a presentation of the classifications of individual programme elements would enable a user to rapidly access any series of programme elements which on the basis of the allocated value classifications is likely to be of significant interest.

What is claimed is:

1. A method for generating a programme for presentation as a sequence of programme elements from a set of pre-recorded programme elements, comprising:

classifying the programme elements on the basis of programme element content such that each programme element is allocated to at least one class of a predetermined set of classes, wherein each programme element is classified to at least one class separately from other programme elements allocated to the same at least one class;

storing each classified programme element with at least one associated programme element classification code, each classification code identifying a class to which the associated programme element has been allocated;

generating a programme for presentation on a user display device by selecting at least one programme classification code and presenting at least one programme element associated with said at least one programme classification code, wherein selecting at least one programme classification code comprises displaying user selectable symbols on the user display device, each symbol representing a class of associated programme elements and being selectable by a user, and receiving user input corresponding to at least one symbol selected by a user; and wherein the user selectable symbols are presented for display on the user display device simultaneous with the presentation of the program.

2. A method according to claim 1, wherein each programme element is classified by reference to a type of event to which the element relates.

3. A method for generating a programme for presentation as a sequence of programme elements from a set of pre-recorded programme elements, comprising:

classifying the programme elements on the basis of programme element content such that each programme element is allocated to at least one class of a predetermined set of classes;

storing each classified programme element with at least one associated programme element classification code, each classification code identifying a class to which the associated programme element has been allocated;

generating a programme for presentation on a user display device by selecting at least one programme classification code and presenting programme elements associated with said at least one programme classification code, wherein selecting at least one programme classification code comprises displaying user selectable symbols on the user display device, each symbol representing a class of associated programme elements and being selectable by a user, and receiving user input corresponding to at least one symbol selected by a user; and wherein each programme element is classified by reference to a subjective assessment of a value within a range of relative values extending from a low value to a high value.

4. A method according to claim 1, further comprising further classifying program elements by a subjective assessment of value.

5. A method according to claim 1, wherein symbols are displayed in an order corresponding to the temporal order of events represented by the associated programme elements.

6. A method according to claim 1, further comprising:

receiving user input for selecting a sub-set of classes; and displaying to the user only symbols corresponding to programme elements associated with the selected sub-set of classes.

7. A method according to claim 1, wherein presenting programme program elements comprises presenting a plurality of programme elements simultaneously.

8. A method according to claim 7, wherein video and audio programme elements are presented simultaneously.

9. A method according to claim 7, wherein still image and video programme elements are presented simultaneously.

10. A method according to claim 1, further comprising transmitting programme elements to the user's display device and storing programme elements with the associated programme classification codes at a memory associated with the user's display device.

11. A method according to claim 10, further comprising:

receiving user input for selecting a sub-set of classes; and transmitting to the user's display device only programme elements associated with the selected sub-set of classes.

12. A method according to claim 10, further comprising:

receiving user input for selecting a sub-set of classes; and storing at a memory associated with the user's display device only received programme elements that are associated with the selected sub-set of classes.

13. A method according to claim 10, wherein generating a programme comprises combining programme elements transmitted to the user's display device with pre-recorded programme elements stored on a data carrier in a memory device of the user's display device.

14. A method for generating a programme for presentation as a sequence of programme elements from a set of pre-recorded programme elements, comprising:

classifying the programme elements on the basis of programme element content such that each programme element is allocated to at least one class of a predetermined set of classes;

storing each classified programme element with at least one associated programme element classification code, each classification code identifying a class to which the associated programme element has been allocated;

generating a programme for presentation on a user display device by selecting at least one programme classification code and presenting programme elements associated with said at least one programme classification code;

wherein selecting at least one programme classification code comprises displaying user selectable symbols on the user display device, each symbol representing a class of associated programme elements and being selectable by a user, and receiving user input corresponding to at least one symbol selected by a user;

wherein the user selectable symbols are presented for display on the user display device simultaneous with the presentation of the program;

wherein the method further comprises transmitting programme elements to the user's display device and storing programme elements with the associated programme classification codes at a memory associated with the user's display device; and wherein at least one stored programme element is read out such that the duration of the programme element in the generated programme is less than the time taken to transmit a data packet of that programme element to the display device.

15. A method according to claim 14, wherein generating a programme for presentation on a user display device further comprises repeating the presentation on the user display device of at least one transmitted programme element.

16. A method according to claim 1, further comprising:
associating an advertisement to an event represented by a particular programme element; and
presenting advertisements serially with the programme elements to which they are linked.

17. A method according to claim 1, further comprising:
associating an advertisement to an event represented by a particular programme element; and
presenting advertisements in parallel with the programme elements to which they are linked.

18. A method according to claim 1, wherein selecting at least one classification code comprises:
receiving user input corresponding to a classification code identifying a class of interest; and
alerting the user to the presentation of a programme element of the selected class of interest.

19. A method according to claim 1, wherein each classification code represent a subjective indication of the value of programme elements in the class associated with the classification code.

20. A method for generating a programme for presentation as a sequence of programme elements from a set of pre-recorded programme elements, comprising:
classifying the programme elements on the basis of programme element content such that each programme element is allocated to at least one class of a predetermined set of classes;
storing each classified programme element with at least one associated programme element classification code, each classification code identifying a class to which the associated programme element has been allocated;
generating a programme for presentation on a user display device by selecting at least one programme classification code and presenting programme elements associated with said at least one programme classification code,
wherein selecting at least one programme classification code comprises displaying user selectable symbols on the user display device, each symbol representing a class of associated programme elements and being selectable by a user, and receiving user input corresponding to at least one symbol selected by a user;

wherein each classification code represents a subjective indicative of the value of programme elements in the class associated with the classification code; and wherein receiving user input comprises receiving input corresponding to user-selected classification codes above a threshold value.

21. An apparatus for generating a programme for presentation as a sequence of programme elements from a set of pre-recorded programme elements, comprising
means for storing programme elements with associated programme classification codes, each classification code identifying a class selected from a predetermined set of classes to which class an associated programme element has been allocated on the basis of programme element content, wherein the programme element is allocated to at least one class separately from other programme elements allocated to the same at least one class;
means for selecting at least one programme classification code; and
means for generating a programme by presenting programme elements associated with the selected said at least one programme classification code, including means for displaying symbols to the operator of a display device, the symbols representing the class of associated stored programme elements, and means for operation by the operator to select displayed symbols and thereby select the associated programme elements for presentation by the display device;
wherein the symbols are displayed to the operator of a display device simultaneous with the presentation of programme elements by the display device.

22. An apparatus for generating a programme for presentation to a user as a sequence of programme elements from a set of pre-recorded programme elements, comprising
a memory device for storing programme elements with associated programme classification codes, each classification code identifying a class selected from a predetermined set of classes to which class an associated programme element has been allocated the basis of programme element content, wherein the programme element is allocated to at least one class separately from other programme elements allocated to the same at least one class; and
a user-terminal having a controller for generating a programme by presenting programme elements associated with at least one selected programme classification code, a display device for displaying symbols to the user, the symbols representing the class of associated stored programme elements, and a user input device for operation by the user to select displayed symbols and thereby select at least one classification code, for presentation of programme elements associated with the at least one selected classification code on the display device;
wherein the symbols are displayed to the user simultaneous with the presentation of programme elements on the display device.

* * * * *